(12) United States Patent
Endo (10) Patent No.: US 6,385,401 B1
(45) Date of Patent: May 7, 2002

(54) CAMERA WITH MOTOR-DRIVEN ZOOM LENS AND MOTOR-DRIVEN FILM-ADVANCE MECHANISM

(75) Inventor: Ken Endo, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 09/628,322

(22) Filed: Jul. 28, 2000

(30) Foreign Application Priority Data

Jul. 29, 1999 (JP) .......................................... 11-214666

(51) Int. Cl.[7] .............................. G03B 1/00; G03B 17/00
(52) U.S. Cl. ......................................... 396/85; 396/418
(58) Field of Search ............................. 396/85–87, 418, 396/411

(56) References Cited

U.S. PATENT DOCUMENTS

| | | | | |
|---|---|---|---|---|
| 4,829,328 A | * | 5/1989 | Tanaka et al. | 396/418 |
| 5,083,148 A | * | 1/1992 | Tsuboi | 396/85 |
| 5,105,212 A | | 4/1992 | Kitazawa | 396/413 |
| 5,115,348 A | * | 5/1992 | Notagashira | 396/85 X |
| 5,168,295 A | * | 12/1992 | Yoshihara et al. | 396/411 X |
| 5,602,608 A | * | 2/1997 | Asakura et al. | 396/85 |
| 5,671,449 A | | 9/1997 | Shimizu | 396/132 |
| 5,909,320 A | | 6/1999 | Oono et al. | 359/696 |
| 5,956,533 A | | 9/1999 | Endo et al. | 396/85 |
| 6,321,038 B1 | * | 11/2001 | Kudoh | 396/418 X |

* cited by examiner

*Primary Examiner*—W. B. Perkey
(74) *Attorney, Agent, or Firm*—Greenblum & Bernstein P.L.C.

(57) ABSTRACT

A camera having a motor-driven zoom lens and a motor-driven film-advance mechanism uses a single electric motor and a drive train to selectively driving the zoom lens and the film-advance mechanism by the electric motor. A zoom control knob is provided, which has an inoperative position for inactivating zoom operation and first and second operative positions for activating zoom operation toward the longest-focal-length end and that toward the shortest-focal-length end, respectively. The drive train is cooperative with the zoom control knob and operatively interconnects the motor, the zoom lens and the film-advance mechanism, for selectively allowing the zoom lens and the film-advance mechanism to be driven by the motor in accordance with current position of the zoom control knob. The drive train includes a planetary gearing system having a sun gear, a planetary carrier-and-gear-wheel assembly and a ring gear, which are supported for rotation about a common axis, and which are operatively connected to the motor, the zoom lens and said the film-advance mechanism, respectively. The planetary gearing system is constructed such that energizing the motor will cause rotation of the ring gear and no rotation of the planetary assembly unless the former is prevented from rotation. The drive train further includes a clamp mechanism for preventing rotation of the ring gear when the zoom control knob is at one of the operative positions.

11 Claims, 8 Drawing Sheets

CAMERA WITH MOTOR-DRIVEN ZOOM LENS AND MOTOR-DRIVEN FILM-ADVANCE MECHANISM

The present disclosure relates to subject matter contained in Japanese Patent Application No. Hei-11-214666 filed on Jul. 29, 1999, which is expressly incorporated herein by reference in its entirety.

BACKGROUND OF THE INVENTION

1. Field of the Invention

The present invention relates to a camera having a motor-driven zoom lens and a motor-driven film-advance mechanism.

2. Description of the Related Art

There have been known various cameras having both a motor-driven zoom lens and a motor-driven film-advance mechanism. Some of them use two separate electric motors for driving the zoom lens and the film-advance mechanism, respectively. Others use a single electric motor for providing a drive torque, and a drive train for selectively transmitting the drive torque of the motor either to the zoom lens or to the film-advance mechanism in accordance with operations of a shutter release button and a zoom control knob, each provided on the body of the camera for user's operation.

Conventional cameras using two separate electric motors tend to be relatively heavy and massive because an electric motor itself is an inherently heavy and massive component. Cameras using a single electric motor may have a somewhat reduced weight due to elimination of a second electric motor. However, they require a drive train for selectively transmitting the torque of the motor either to the zoom lens or to the film-advance mechanism. Conventional drive trains used for this purpose are relatively complicated in arrangement, occupy a relatively large space in the camera, may often have insufficient durability and require cumbersome assemblage process. Also, a typical, conventional drive train may include a pair of electromagnetic clutches controlled by electrical control signals, which clutches are relatively heavy and costly.

SUMMARY OF THE INVENTION

In view of the foregoing, it is an object of the present invention to provide a camera having a motor-driven zoom lens and a motor-driven film-advance mechanism, in which a single electric motor is used to selectively drive the zoom lens and the film-advance mechanism through a unique drive train, which may be simple in construction, may occupy only a small space in the camera, may provide a good durability and may be lightweight.

In accordance with the present invention, there is provided a camera comprising: a camera body; a zoom lens capable of continuous zoom operation between a longest-focal-length end and a shortest-focal-length end; a film-advance mechanism for advancing a roll of film loaded in the camera; and a zoom control knob provided on the camera body for camera user's operation. The zoom control knob has three positions including an inoperative position for inactivating zoom operation and first and second operative positions for activating zoom operation toward the longest-focal-length end and zoom operation toward the shortest-focal-length end, respectively.

The camera further comprises a drive power unit including an electric motor for providing a drive torque; a motor control for controlling energized/de-energized state and rotating direction of the motor; and a drive train. The drive train is cooperative with the zoom control knob and operatively interconnects the drive power unit, the zoom lens and the film-advance mechanism, for selectively allowing the zoom lens and the film-advance mechanism to be driven by the drive power unit in accordance with current position of the zoom control knob.

In an embodiment, the drive power unit has an output shaft for outputting a drive torque. The zoom lens has an input member to be driven to achieve zoom operation. The film-advance mechanism has an input member to be driven to achieve film-advance operation. Further, the drive train operatively interconnects the output shaft of the drive power unit, the input member of the zoom lens and the input member of the film-advance mechanism.

The drive train may comprise a planetary gearing system having a sun gear, a planetary carrier-and-gear-wheel assembly and a ring gear, which are supported for rotation about a common axis. The planetary carrier-and-gear-wheel assembly may include one or more planetary gear wheels in engagement with both the sun gear and the ring gear so as to transmit a drive torque among the sun gear, the planetary carrier-and-gear-wheel assembly and the ring gear. The sun gear, the planetary carrier-and-gear-wheel assembly and the ring gear may be operatively connected to the output shaft of the drive power unit, the input member of the zoom lens and the input member of the film-advance mechanism, respectively. The planetary gearing system may be constructed such that the ratio of a drive torque acting on the ring gear to that acting on the planetary carrier-and-gear-wheel assembly is greater than the ratio of a required torque for the ring gear to achieve film-advance operation to that for the planetary carrier-and-gear-wheel assembly to achieve zoom operation, so that energizing the motor will cause rotation of the ring gear and no rotation of the planetary carrier-and-gear-wheel assembly unless the former is prevented from rotation. Finally, the drive train may further comprise a ring-gear-rotation preventing mechanism, which is inactive when the zoom control knob is at the inoperative position while active when the zoom control knob is at one of the first and second operative positions to prevent rotation of the ring gear.

The ring-gear-rotation preventing mechanism may comprise a clamp mechanism for clamping the ring gear to prevent rotation thereof when the zoom control knob is at one of the first and second operative positions.

The clamp mechanism may comprise a coiled spring secured to the camera body and surrounding a portion of the ring gear. In such a case, the zoom control knob may be supported by the camera body for movement between the first and second operative positions, with the inoperative position being defined between the first and second operative positions, and the coiled spring may have two end arms each engageable with both the camera body and the zoom control knob such that the coiled spring is tightened against and thereby clamps the portion of the ring gear to prevent rotation of the ring gear when the zoom control knob is at one of the first and second operative positions while the coiled spring is loosened from and thereby releases the portion of the ring gear to permit rotation of the ring gear when the zoom control knob is at the inoperative position.

The film-advance mechanism may comprise a film take-up spool of a generally hollow cylindrical shape having an axis. In such a case, the drive power unit may be of a generally cylindrical shape having an axis, with which the output shaft of the drive power unit is coaxial. Also, the drive power unit may be disposed in the film take-up spool such that the axis of the drive power unit and the axis of the film take-up spool are both coaxial with the planetary gearing system.

The drive power unit may further include a reduction gear box associated with the electric motor.

The camera may further comprise first and second electrical switches to be actuated by the zoom control knob when the zoom control knob is actuated into the first and second operative positions, respectively, and the motor control may control the rotating direction of the electric motor in response to open/close conditions of the electrical switches.

BRIEF DESCRIPTION OF THE DRAWINGS

The above and other objects, features and advantages of the present invention will be apparent from the following detailed description of a preferred embodiment thereof, reference being made to the accompanying drawings, in which.

DETAILED DESCRIPTION OF A PREFERRED EMBODIMENT

Referring now to the accompanying drawings, a camera constructed and arranged in accordance with a preferred embodiment of the present invention will be described in detail.

Figure 1:
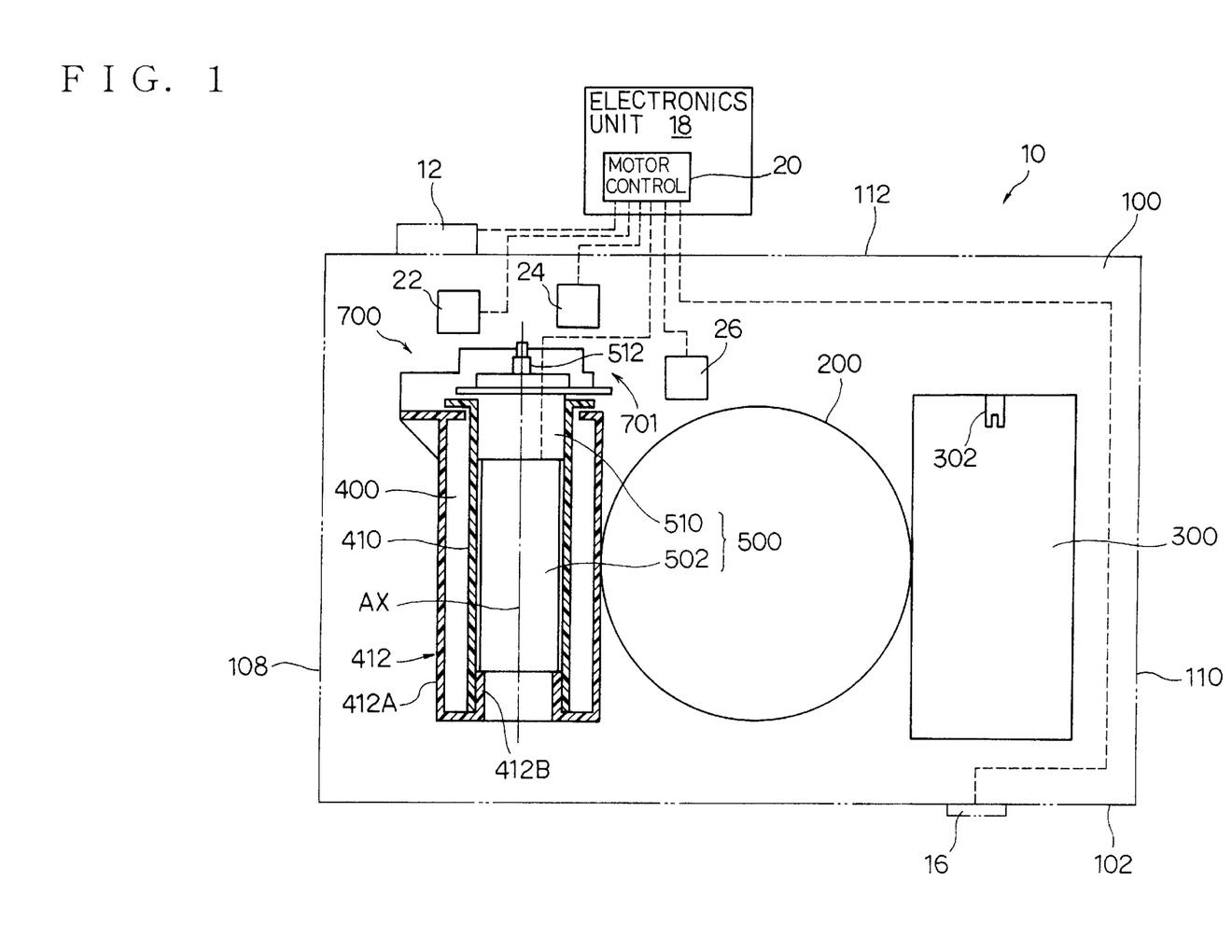
FIG. 1 is a schematic front elevational view showing the general construction of a camera constructed and arranged in accordance with a preferred embodiment of the present invention.
Figure 2:
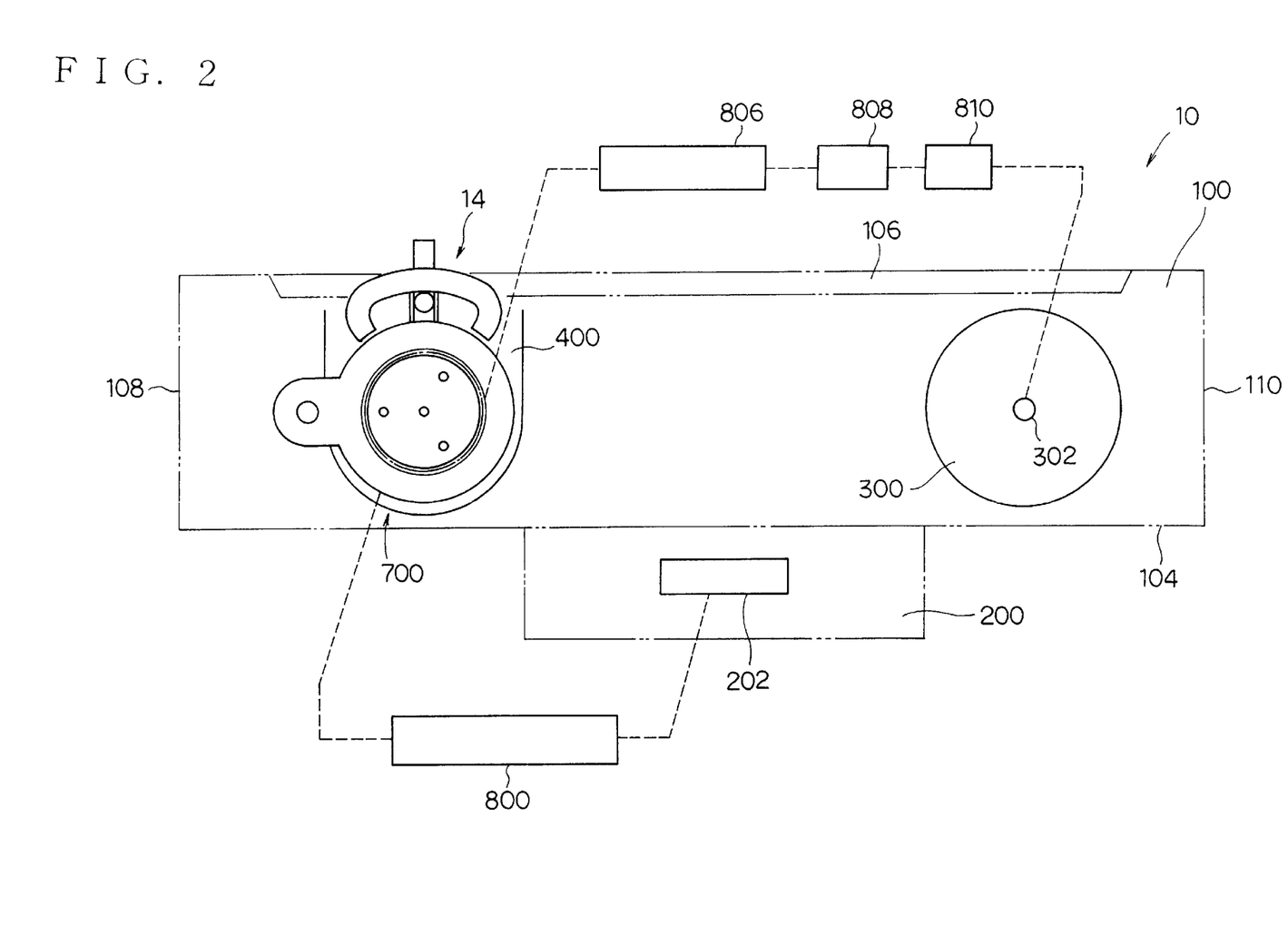
FIG. 2 is a schematic top view of the camera of FIG. 1.

FIGS. 1 and 2 schematically show the general construction of a camera 10 constructed and arranged in accordance with a preferred embodiment of the present invention. The camera 10 has a camera body 100 and a motor-driven zoom lens 200. In the camera body 100, there are defined a film cartridge chamber 300 and a film take-up chamber 400. The camera 10 further has a motor-driven film-advance mechanism for advancing a roll of film out of a cartridge and a motor-driven film-rewind mechanism for rewinding the film into the cartridge after exposed. In order to drive the zoom lens 200, the film-advance mechanism and the film-rewinding mechanism, the camera 10 has a drive power unit 500 and a drive train 700 both housed in the camera body 100.

The camera body 100 is of a generally box-shaped, having a bottom wall 102, a front wall 104, a back door 106, right and left side-walls 108 and 110 and a top wall 112, all of which are shown only schematically in FIGS. 1 and 2.

The zoom lens 200 is capable of continuous zoom operation between a longest-focal-length end and a shortest-focal-length end. There have been proposed various zoom lenses having this functionality, any of which may be used for the present invention. The zoom lens 200 has an input member 202 (schematically shown in FIG. 2) to be driven to achieve zoom operation. The input member 202 may be, for example, a rotating ring, a rotating cylinder or a sliding cam plate, as is well known in the art.

The camera 10 has a shutter-release button 12 (FIG. 1), a zoom control knob 14 (FIG. 2) and a rewind button 16 (FIG. 1), all of which are provided on the camera body 100 for camera user's operation. The shutter-release button 12 and the rewind button 16 each has an electrical switch (not shown) associated therewith. The zoom control knob 14 has three positions including an inoperative position for inactivating zoom operation and first and second operative positions for activating zoom operation toward the longest-focal-length end and zoom operation toward the shortest-focal-length end, respectively. The zoom control knob 14 has first and second electrical switches 22 and 24 (referred to as the "zoom switches" hereinafter) associated therewith, which will be discussed later in detail with reference to FIGS. 3 to 6.

The camera 10 also has an electronics unit 18 (FIG. 1), which provides various known control functions such as required for recent electronically controlled cameras. Those of the control functions which are significant for the present invention will be described later in relation to exemplified operations of the camera 10. The electronics unit 18 contains a motor control 20, to which the electrical switches associated with the shutter-release button 12 and the film-rewind button 16, as well as the zoom switches 22 and 24 are electrically connected. The camera 10 further has a perforation sensor 26 for detecting the perforations formed along the edges of a roll of film for various purposes such as described later in detail. The perforation sensor 26 is also electrically connected to the motor control 20.

The film cartridge chamber 300 is defined in the camera body 100 on one side of the zoom lens 200 for receiving a film cartridge. In the film cartridge chamber 300, there is provided a rewind spindle 302 of a known type (which forms a part of the film-rewind mechanism) for driving the spool of the film cartridge when film-rewind operation is to take place.

Figure 4:
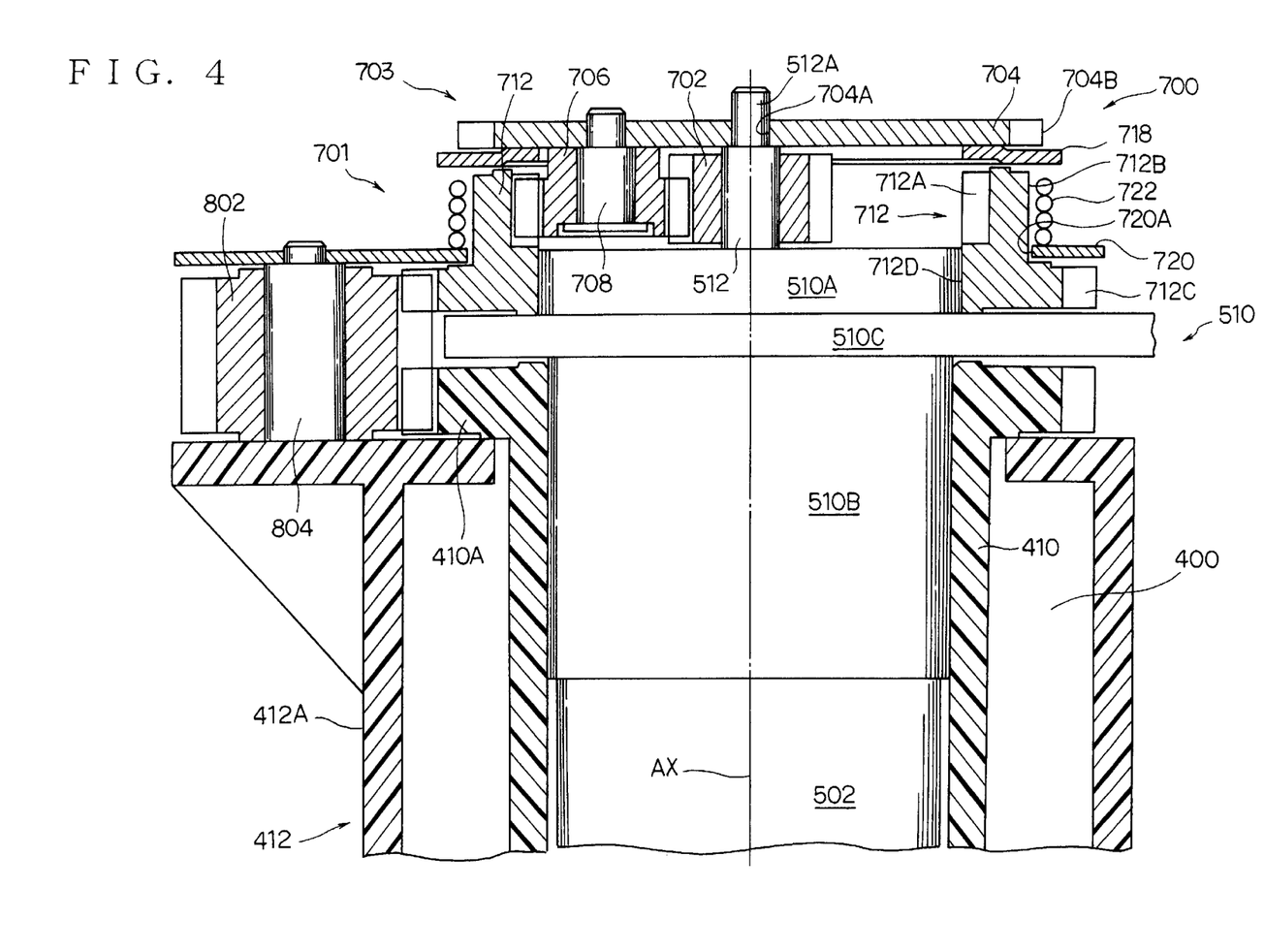
FIG. 4 is a cross-sectional view taken along line IV—IV of FIG. 3.

The film take-up chamber 400 is defined in the camera body 100 on the other side of the zoom lens 200, in which a film take-up spool 410 (which forms a part of the film-advance mechanism) is disposed. The film take-up spool 410 is of a generally hollow cylindrical member having an axis extending in vertical direction. As shown in FIGS. 1 and 4, the drive power unit 500 is also of a generally cylindrical shape having an axis AX extending in vertical direction. The drive power unit 500 is disposed inside and coaxial with the film take-up spool 410. The drive power unit 500 includes an electric motor 502 for providing a drive torque and an associated reduction gear box 510 fixedly connected to the motor 502. The motor 502 is electrically connected to the motor control 20, which controls energized/de-energized state and rotating direction of the electric motor 502.

The drive power unit 500 has an output shaft 512 for outputting a drive torque, which extends in vertical direction and is coaxial with the axis AX of the drive power unit 500. The reduction gear box 510 has upper and lower cylindrical surfaces 510A and 510B, which are also coaxial with the axis AX of the drive power unit 500. The reduction gear box 510 further has a radial, horizontal flange 510C formed between the upper and lower cylindrical surfaces 510A and 510B. The flange 510C is fixedly connected to a part of the camera body 100, so that the drive power unit 500 is fixedly secured to and supported by the camera body 100.

The film take-up chamber 400 is defined by a chamber wall member 412 forming a part of the camera body 100. The chamber wall member 412 includes a partial cylindrical wall portion 412A, which is generally coaxial with the axis AX of the drive power unit 500 and is open toward the back door 106. The chamber wall member 412 further includes at its bottom end an upright, cylindrical collar portion 412B, which is also coaxial with the axis AX of the drive power unit 500.

The hollow, cylindrical, film take-up spool 410 has its upper end fitted over the lower cylindrical surface 510B of the reduction gear box 510 for free rotation. Also, the film take-up spool 410 has its lower end fitted over the collar portion 412B of the chamber wall member 412 for free rotation. In this manner, the film take-up spool 410 is supported for rotation about the axis AX of the drive power unit 500.

As described, the film take-up spool 410 forms a part of the motor-driven film-advance mechanism. The film take-up spool 410 has a radial, horizontal flange at its upper end, which forms a spur gear 410A for receiving the drive torque supplied for driving the film-advance mechanism. Thus, the film take-up spool 410 serves as an input member of the film-advance mechanism to be driven to achieve film-advance operation.

The drive train 700 is cooperative with the zoom control knob 14 and operatively interconnects the drive power unit 500, the zoom lens 200 and the film-advance mechanism, for selectively allowing the zoom lens 200 and the film-advance mechanism to be driven by the drive power unit 500 in accordance with current position of the zoom control knob 14.

Figure 3:
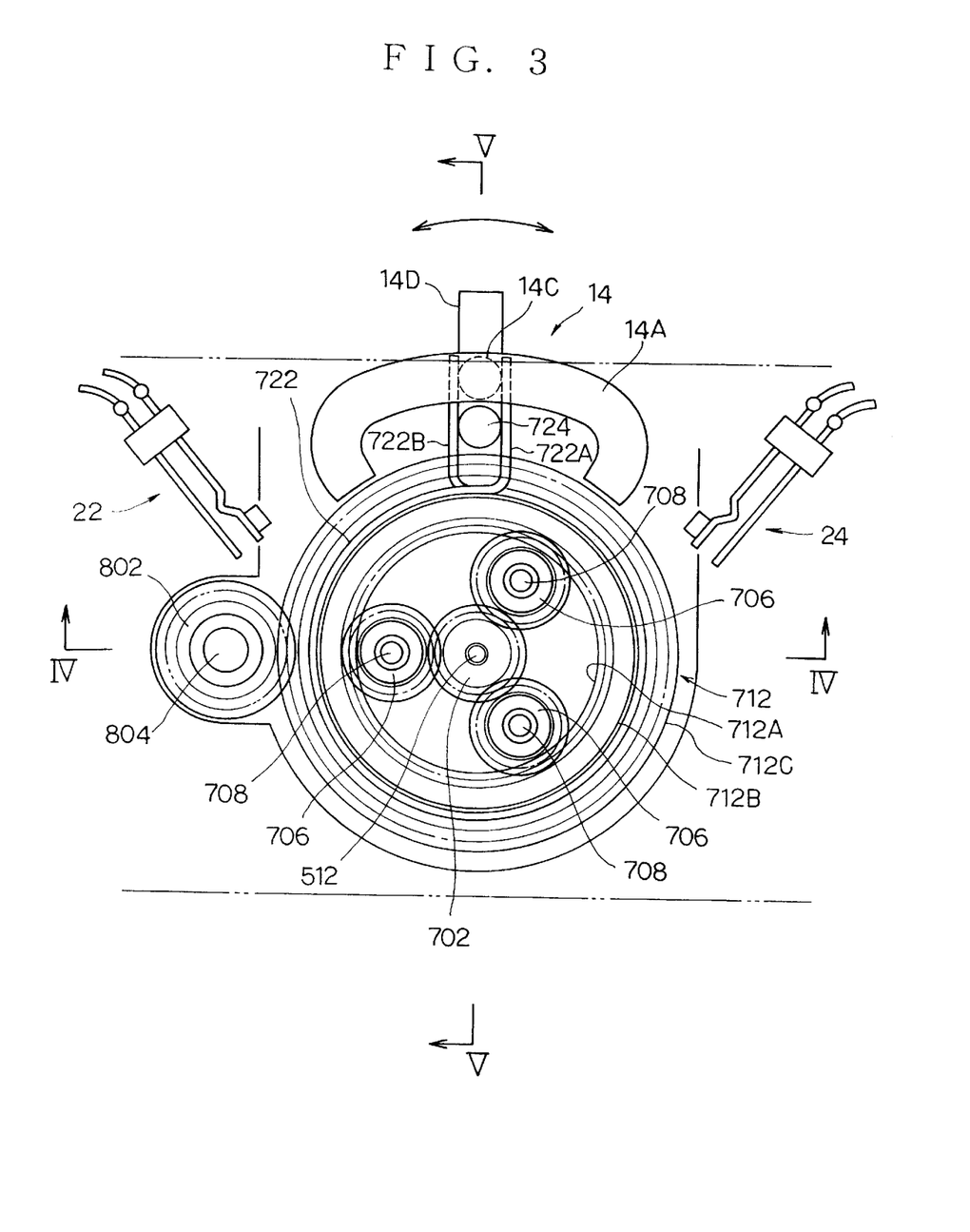
FIG. 3 is an enlarged view of a portion of FIG. 1, showing a drive train of the camera.

More specifically, the drive train 700 includes a planetary gearing system 701, which operatively interconnects the output shaft 512 of the drive power unit 500, the input member 202 of the zoom lens 200 and the film take-up spool 410 (i.e., the input member of the film-advance mechanism). As shown in FIGS. 3 and 4, the planetary gearing system 701 comprises a sun gear 702, a planetary carrier-and-gear-wheel assembly 703 and a ring gear 712, which are supported for rotation about a common axis.

The sun gear 702 is directly mounted and fixed to the output shaft 512 of the drive power unit 500, so that the sun gear 702 is driven to rotate about the axis AX of the drive power unit 500. The common axis of the elements of the planetary gearing system 701 is therefore coincident with the axis AX of the drive power unit 500.

The planetary carrier-and-gear-wheel assembly 703 (referred to more simply as "planetary assembly" hereinafter) includes a planetary carrier 704 (see FIG. 4; it is omitted in FIG. 3 for clearly showing other components behind it) and three planetary gear wheels 706 carried on and connected to the planetary carrier 704 for rotation by means of respective pins 708.

As shown in FIG. 4, the output shaft 512 of the drive power unit 500 has a reduced diameter portion 512A at its tip end. The planetary carrier 704 is a circular plate or disk having a central hole 704A, at which it is loosely fitted over the reduced diameter portion 512A of the output shaft 512 for rotation relative to the latter. The planetary gearing system 701 also has a first, ring-shaped support plate 718 (see FIG. 4; it is omitted in FIG. 3 for clearly showing other components) disposed between the planetary carrier 704 and the ring gear 712 and secured to the camera body 100. The planetary carrier 704 is supported at its periphery by the first support plate 718. With this arrangement, the output shaft 512 of the drive power unit 500 and the first support plate 718 cooperate to support the planetary assembly 703 for rotation about the axis AX of the drive power unit 500.

The planetary carrier 704 has gear teeth 704B formed along its peripheral edge, by means of which the planetary assembly 703 is in engagement with a first gear train 800 (schematically shown in FIG. 2), which in turn is in engagement with the input member 202 of the zoom lens 200. In this manner, the planetary assembly 703 is operatively connected to the zoom lens 200, so that either zooming operation toward the longest-focal-length end or that toward the shortest-focal-length end takes place depending on the rotating direction of the planetary assembly 703 and thus on the rotating direction of the motor 502.

The ring gear 712 has internal teeth 712A and a cylindrical outer surface 712B both formed in its upper portion, and external teeth 712C and a cylindrical inner surface 712D both formed in its lower portion. All of these features of the ring gear 712 are coaxial. The ring gear 712 is loosely fitted at its cylindrical inner surface 712D over the upper cylindrical surface 510A of the reduction gear box 510 and placed on the top surface of the horizontal flange 510C of the reduction gear box 510. In this manner, the ring gear 712 is supported by the drive power unit 500 for rotation about the axis AX of the latter. The planetary gearing system 701 also has a second support plate 720 (see FIG. 4; it is omitted in FIG. 3 for clearly showing other components) secured to the camera body 100, which is disposed to retain the ring gear 712 in position.

The ring gear 712 is in engagement with an intermediate gear wheel 802 by means of the external teeth 712C. The gear wheel 802 is secured to the chamber wall member 412 for rotation by a pin 804, and is further in engagement with the spur gear 410A of the film take-up spool 410. In this manner, the ring gear 712 is operatively connected to the film-advance mechanism.

The ring gear 712 is also in engagement with a second gear train 806 by mens of the external gear teeth 712C. The second gear train 806 is operatively connected to the rewind spindle 302 through a one-way clutch 808 and a slip-coupling 810, so as to form the film-rewind mechanism. While the film take-up spool 410 may be driven to rotate in both directions (referred to as the "forward and reverse directions" for convenience), the rewind spindle 302 may be driven to rotate only in one direction, the reverse direction, by means of the one-way clutch 808, in order to achieve film-rewind operation. Further, the rewind spindle 302 is driven to rotate at a higher speed than the film take-up spool 410, with the difference in film-feed speed between them being compensated by the slip-coupling 810.

The planetary gear wheels 706 are each in engagement with both the sun gear 702 and the ring gear 712 so as to transmit a drive torque among the sun gear 702, the planetary assembly 703 and said ring gear 712. As is well known in connection with planetary gearing systems, the ratio of the drive torque acting on the ring gear to that acting on the planetary assembly is constant at any time. The ratio may be determined exclusively by the numbers of teeth of the sun gear and the ring gear. Specifically, the ratio $R_{torque.act}$ can be expressed as $R_{torque.act}=N_{ring}/(N_{ring}+N_{sun})$, where $N_{ring}$ stands for the number of teeth of the ring gear and $N_{sun}$ stands for the number of teeth of the sun gear.

On the other hand, the required torque for the ring gear 712 to achieve film-advance operation is approximately determined by the frictions acting on the roll of film to be advanced, the film take-up spool 412 and the intermediate gear wheel 802. Also, the required torque for the planetary assembly 703 to achieve zoom operation is approximately determined by the frictions acting on the zoom lens 200 and the gear train 800. Thus, the ratio of the former required torque to the latter, which is designated here by $R_{torque.rqrd}$, is approximately constant.

With the planetary gearing system 701 used in the camera 10, the numbers of the teeth of the sun gear 702 and the ring gear 712, $N_{sun}$ and $N_{ring}$, are chosen such that the first-mentioned ratio $R_{torque.act}$ is greater than the second-mentioned ratio $R_{torque.rqrd}$. As understood, according to such design criteria, energizing the motor 502 will cause rotation of the ring gear 712 and no rotation of the planetary assembly 703 unless the former is prevented from rotation. The present invention utilizes this for selectively allowing the zoom lens 200 and the film-advance mechanism to be driven by the drive power unit 500 in accordance with current position of the zoom control knob 14. For the purposes, the drive train 700 further includes a ring-gear-rotation preventing mechanism, which is inactive when the zoom control knob 14 is at the inoperative position while active when the zoom control knob 14 is at one of the first and second operative positions to prevent rotation of the ring gear 712.

Figure 5:
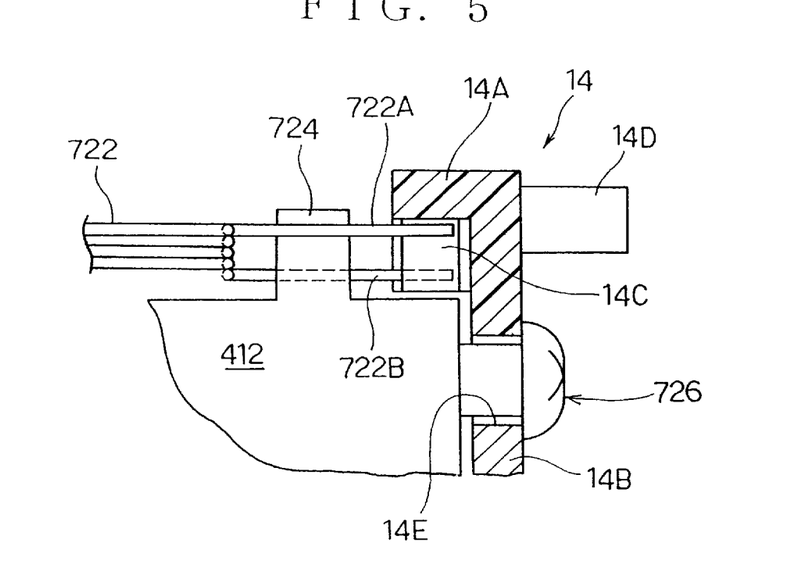
FIG. 5 is a cross-sectional view taken along line V—V of FIG. 3.
Figure 6:
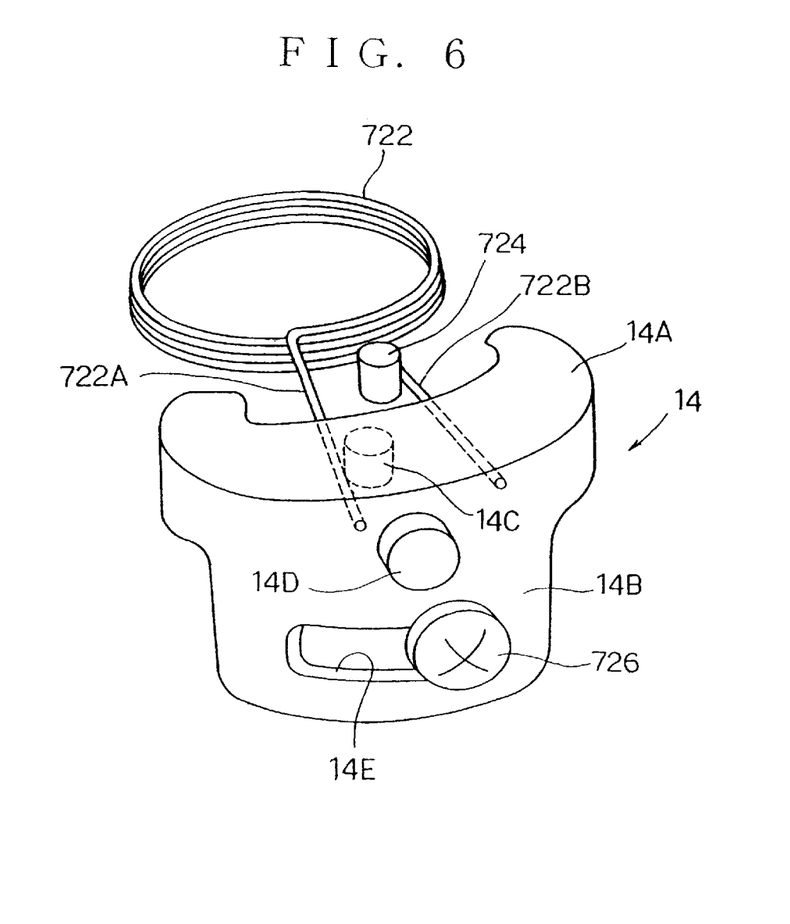
FIG. 6 is a perspective view showing a zoom control knob and an associated coiled spring of the camera.

More specifically, the ring-gear-rotation preventing mechanism is constructed as a clamp mechanism for clamping the ring gear 712 to prevent its rotation when the zoom control knob 14 is at one of the first and second operative positions. As shown in FIGS. 3, 5 and 6, the clamp mechanism includes a coiled spring 722 cooperating with the zoom control knob 14. The coiled spring 722 is disposed between the first and second support plates 718 and 720 to surround the cylindrical outer surface 712B of the ring gear 712. The coiled spring 722 has first and second end arms 722A and 722B extending radially outward, which are engageable with a pin 724 formed on the top surface of the chamber wall member 412 forming a part of the camera body 100, so that the coiled spring 722 is secured to the camera body 100 by such engagement. Since the pin 724 is fixed relative to the camera body 100, it is referred to as the "fixed pin" hereinafter.

The zoom control knob 14 has an upper yoke portion 14A extending along a horizontal top surface of the chamber wall member 12, and a lower apron portion 14B extending along a vertical cylindrical surface of the chamber wall member 412. The zoom control knob 14 also has a vertical pin 14C depending from the yoke portion 14A in front of the apron portion 14B, and a rear projection 14D projecting rearward from the yoke portion 14A to extend out of the camera body 100. Since the pin 14C is movable relative to the camera body 100, it is referred to as the "movable pin" hereinafter. The end arms 722A and 722B of the coiled spring 722 are also engageable with the movable pin 14C.

The apron portion 14B of the zoom control knob 14 has an horizontally-extending, elongated guide hole 14E formed therein, through which a screw 726 secured to the chamber wall member 412 extends. The screw 726 is loosely received in the guide hole 14E. With this arrangement, the zoom control knob 14 is guided circumferentially along the vertical cylindrical surface of the chamber wall member 412, and thus guided for horizontal movement about the axis AX of the drive power unit 500. This horizontal movement is limited by engagement of the screw 726 against the opposite ends of the guide hole 14E, so that the first and second operative positions of the zoom control knob 14 is defined as such positions by the guide hole 14E and the screw 726.

As seen from FIGS. 3, 5 and 6, the movable pin 14C of the zoom control knob 14 and the fixed pin 724 of the chamber wall member 412 are always between the first and second end arms 722A and 722B of the coiled spring 722, irrespective of current position of the movable pin 14C. When the zoom control knob 14 is left unactuated by the camera user, the movable pin 14C is urged by the coiled spring 722 into the position nearest to the fixed pin 724, so that the inoperative position of the zoom control knob 14 is defined as such position between the first and second operative position, by means of the coiled spring 722.

With the zoom control knob 14 being left at the inoperative position such as shown in FIG. 3, the first and second end arms 722A and 722B of the coiled spring 722 is nearest to each other, when the coiled spring 722 is loosened from and thereby releases the cylindrical surface 712C of the ring gear 712 to permit rotation of the ring gear 712.

On the other hand, with the zoom control knob 14 being actuated and located at one of the first and second operative positions such as shown in FIG. 6, one of the first and second end arms 722A and 722B of the coiled spring 722 is displaced by the movable pin 14C while the other end arm is retained at the original position by the fixed pin 724, when the coiled spring 722 is tightened against and thereby clamps the outer cylindrical surface 712B of the ring gear 712 to prevent its rotation.

The first and second zoom switches 22 and 24 are normally-open switches, and are disposed near the zoom control knob 14 such that they are closed when the zoom control knob 14 is actuated into the first and second operative positions, respectively, by engagement of respective ends of the yoke portion 14A of the zoom control knob 14 with the them. The zoom switches 22 and 24 are electrically connected to the motor control 20, which determines current position of the zoom control knob 14 from the open/close conditions of the switches 22 and 24 and controls energized/de-energized state and rotating direction of the motor 502 in response to the determined conditions.

Figure 7:
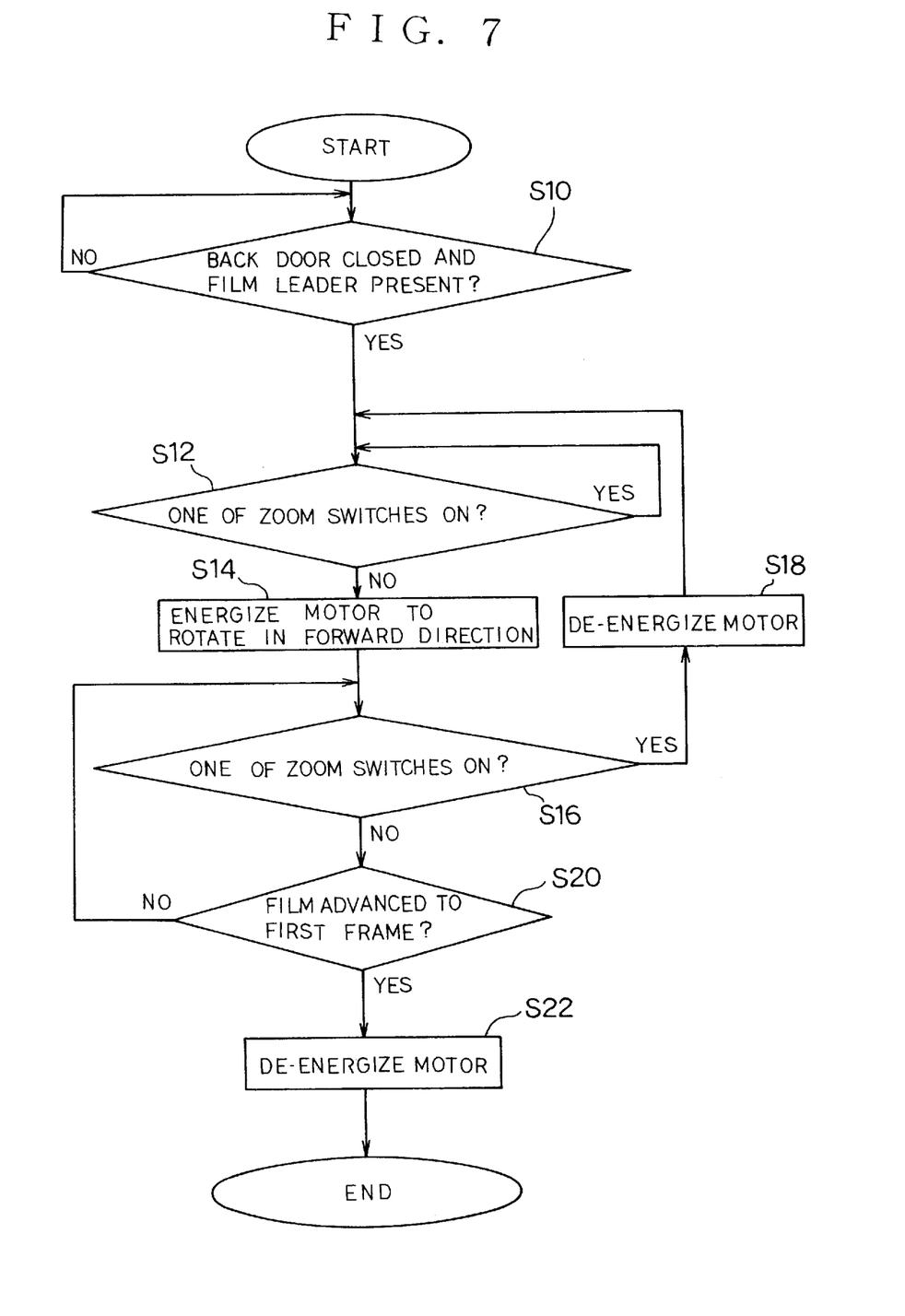
FIG. 7 is a flow diagram illustrating control procedure for film-loading operation performed with the camera of FIG. 1.
Figure 8:
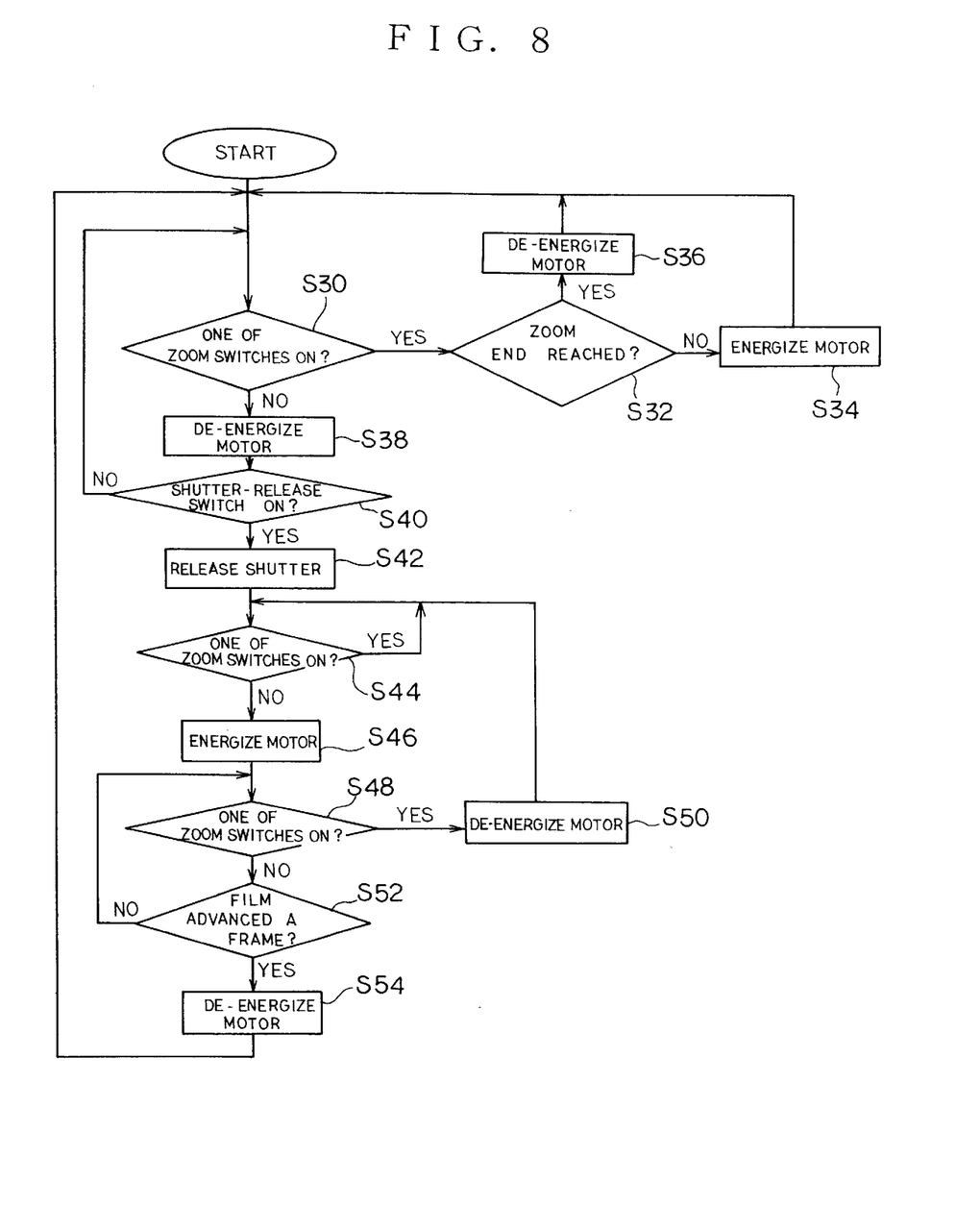
FIG. 8 is a flow diagram illustrating control procedure for zoom operation and film-advancing operation performed with the camera of FIG. 1.
Figure 9:
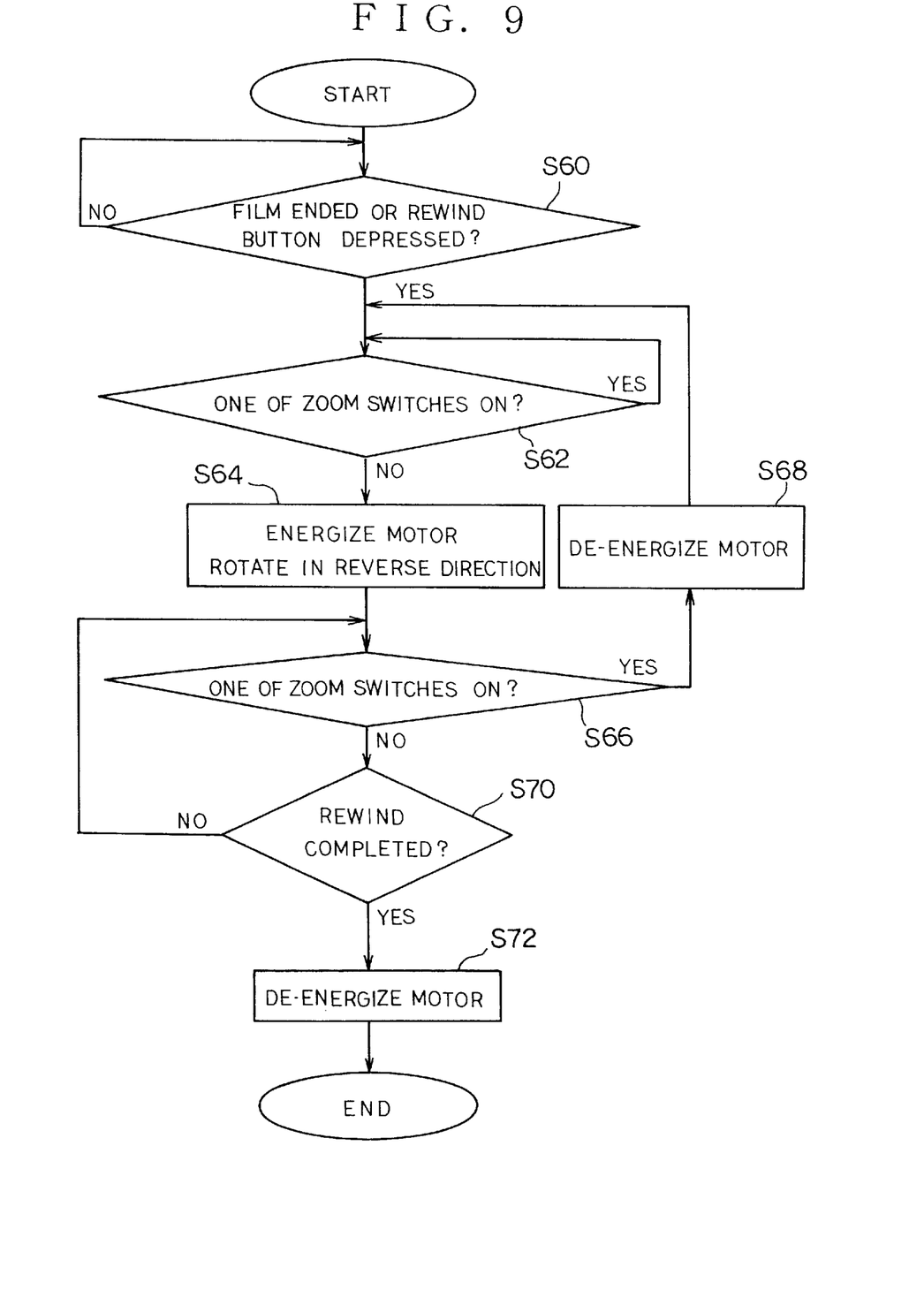
FIG. 9 is a flow diagram illustrating control procedure for film-rewind operation performed with the camera of FIG. 1.

With reference now to flow diagrams of FIGS. 7, 8 and 9, control procedures of the camera 10 performed for the film-loading operation, the zoom operation, the film-advance operation and the film-rewind operation are described in detail.

FIG. 7 shows a flow diagram illustrating the control procedure for the film-loading operation in order to load a new roll of film, which sits in a light-tight cartridge. The film-loading operation is commenced automatically when the back door 106 is closed. Specifically, for loading a roll of film, the camera user opens the back door 106 and places the film cartridge in the film cartridge chamber 300. Then, the user pulls the film leader, or tongue, over to a marked position inside the camera body 10 near the film take-up spool 410 and closes the back door 106. If both the closure of the back door 106 and the presence of the film leader at the marked position are detected by the electronics unit 18 through a back-door sensor (not shown) and the perforation sensor 26 (step S10), then the procedure proceeds to step S12 to commence the film-loading operation.

Whenever the procedure reaches step S12, the motor 502 is in the de-energized state. At step S12, it is determined whether one of the zoom switches 22 and 24 is turned on. If so (YES), the procedure loops within step S12 to leave the motor 502 de-energized. This means that actuation of the zoom control knob 14 by the camera user into one of the operative positions will prevent energizing the motor 502 at all.

Otherwise, if none of the zoom switches 22 and 24 are turned on, the procedure proceeds to step S14, where the motor control 20 energizes the motor 502 to rotate it in the forward (film-advance) direction. When the procedure reaches step S14, the zoom control knob 14 is left at the inoperative position and thereby the coiled spring 722 is loosened from and thereby releases the ring gear 712 to permit its rotation, so that the ring gear 712 drives the film take-up spool 412 to start advancing the film.

Thereafter, it is determined whether one of the zoom switches 22 and 24 is turned on (step S16). If so (YES), meaning that the camera user has actuated the zoom control knob 14 after the motor 502 is energized, then the procedure proceeds to step S18 to de-energize the motor 502. Subsequently, the procedure loops back to step S12 to leave the motor 502 de-energized. This means that the film-loading operation will be halted when the zoom control knob 14 is actuated by the camera user into one of the operative positions during the film-loading operation.

Otherwise, if the determination at step S16 is negative (NO), then the procedure proceeds to step S20, where it is determined based on a detection signal from the perforation sensor 26 whether the film has been advanced to the first frame. If the determination is negative (NO), meaning that the film is not yet advanced to the first frame, then the procedure loops back to step S16 to continue advancing the film until it reaches the first frame. Otherwise, if the determination at step S20 is positive (YES), then the procedure proceeds to step S22 to de-energize the motor 502 so as to stop advancing the film. The film-loading operation is completed at this point of time.

FIG. 8 shows a flow diagram illustrating the control procedure of the camera 10 to be performed after the film-loading operation. The control procedure involves the zoom operation, the exposure operation and the film-advance operation. Specifically, the procedure starts with step 30, where it is determined whether one of the zoom switches 22 and 24 is turned on. If so (YES), the procedure proceeds to step S32, where it is determined based on a detection signal from a zoom end detection sensor (not shown) whether the zoom lens 200 has reached that end toward which it is being driven. If the determination is negative (NO), the procedure proceeds to step S34 to energize the motor 502 (if it has been in de-energized state) or leave it energized (if it is already energized), so as to rotate it in the appropriate direction as indicated by the closure of the corresponding zoom switch 22 or 24, and thereby to operate the zoom lens 200 toward the longest-focal-length end or the shortest-focal-length end.

From step S34, the procedure loops back to step S30, and thereafter it proceeds through the loop composed of steps S30, S32 and S34 to continue the zoom operation until either step S32 indicates that the zoom lens 200 has reached the zoom end or step 30 indicates that both of the zoom switches 22 and 24 are turned off, meaning that the user has released the zoom control knob 14 to allow it to return back to the inoperative position. In the former case, the procedure proceeds from step S32 to step S36 to de-energizes the motor 502. Thereafter, the procedure proceeds through the loop composed of steps S30, S32 and S36, leaving the motor 502 de-energized.

When the zoom lens 200 reaches a desired zoom position, the camera user would release the zoom control knob 14 to allow it to return back to the inoperative position, which will result in the negative determination (NO) at step S30. Then, the procedure proceeds from step S30 to step S38 to de-energize the motor 502 (if it has been in energized state) or leave it de-energized (if it is already de-energized). Thereafter, at step S40, it is determined whether the shutter-release switch is turned on. If not (NO), the procedure loops back to step S30.

Steps S30 through S40 described above effectively establish the shutter-release waiting state, during which zoom operation is permitted. When the camera user depresses the shutter button, the determination at step 40 will become positive (YES). Then, the shutter is released for exposure of the frame (step S42). Thereafter, film-advance operation takes place through steps S44 to S54 described below.

Whenever the procedure reaches step S44, the motor 502 is in the de-energized state. At step S44, it is determined whether one of the zoom switches 22 and 24 is turned on. If so (YES), the procedure loops within step S44 to leave the motor 502 de-energized. This means that actuation of the zoom control knob 14 by the camera user into one of the operative positions will prevent energizing the motor 502 at all.

Otherwise, if none of the zoom switches 22 and 24 are turned on, the procedure proceeds to step S46, where the motor control 20 energizes the motor 502 to rotate it in the forward (film-advance) direction. When the procedure reaches step S46, the zoom control knob 14 is left at the inoperative position and thereby the coiled spring 722 is loosened from and thereby releases the ring gear 712 to permit its rotation, so that the ring gear 712 drives the film take-up spool 412 to start advancing the film.

Thereafter, it is determined whether one of the zoom switches 22 and 24 is turned on (step S48). If so (YES), meaning that the camera user has actuated the zoom control knob 14 after the motor 502 is energized, then the procedure proceeds to step S50 to de-energize the motor 502. Subsequently, the procedure loops back to step S44 to leave the motor 502 de-energized. This means that the film-advance operation will be halted when the zoom control knob 14 is actuated by the camera user into one of the operative positions during the film-advance operation.

Otherwise, if the determination at step S48 is negative (NO), then the procedure proceeds to step S52, where it is determined based on a detection signal from the perforation sensor 26 whether the film has been advanced a frame. If the determination is negative (NO), meaning that the film is not yet advanced a frame, then the procedure loops back to step S48 to continue advancing the film until it is advanced to the next frame. Otherwise, if the determination at step S52 is positive (YES), then the procedure proceeds to step S54 to de-energize the motor 502 so as to stop advancing the film. The film-advance operation is completed at this point of time. Thereafter, the procedure loops back to step S30.

FIG. 9 shows a flow diagram illustrating the control procedure for the film-rewind operation to rewind an exposed roll of film back into the cartridge. The film-rewind operation is commenced either when the end of film is detected by a film-end detection sensor (not shown) or when the film-rewind button 16 is depressed by the camera user. In either case, the procedure proceeds from step S60 to step S62 to commence the film-rewind operation.

At step S62, it is determined whether one of the zoom switches 22 and 24 is turned on. If so (YES), the procedure loops within step S62. This means that actuation of the zoom control knob 14 by the camera user into one of the operative positions will inhibit the film-rewind operation.

Otherwise, if none of the zoom switches 22 and 24 are turned on, the procedure proceeds to step S64, where the motor control 20 energizes the motor 502 to rotate it in the reverse (film-rewind) direction. When the procedure reaches step S64, the zoom control knob 14 is left at the inoperative position and thereby the coiled spring 722 is loosened from and thereby releases the ring gear 712 to permit its rotation, so that the ring gear 712 drives both the film take-up spool 412 and the rewind spindle 302 in the reverse direction so to rewind the film back into the cartridge.

Thereafter, it is determined whether one of the zoom switches 22 and 24 is turned on (step S66). If so (YES), meaning that the camera user has actuated the zoom control knob 14 after the motor 502 is energized, then the procedure proceeds to step S68 to de-energize the motor 502. Subsequently, the procedure loops back to step S62 to leave the motor 502 de-energized. This means that the film-rewind operation will be halted when the zoom control knob 14 is actuated by the camera user into one of the operative positions during the film-rewind operation.

Otherwise, if the determination at step S66 is negative (NO), then the procedure proceeds to step S70, where it is determined based on a detection signal from the perforation sensor 26 whether the film has been fully rewound into the cartridge. If the determination is negative (NO), meaning that the film is not yet fully rewound, then the procedure loops back to step S66 to continue rewinding the film until it is fully rewound and housed in the cartridge. Otherwise, if the determination at step S70 is positive (YES), then the procedure proceeds to step S72 to de-energize the motor 502. The film-rewind operation is completed at this point of time.

It is noted that the planetary gearing system 701 used in the camera 10 is a kind of differential gearing system having first, second and third rotationally-operative input/output ends, among which a drive torque may be transmitted. There have been proposed differential gears of various other configurations, which may be possibly used to embody the present invention as well. In such a case, the first, second and third rotationally-operative ends of the differential gearing system may be operatively connected to the drive power unit, the zoom lens and the film-advance mechanism, respectively. As with the disclosed embodiment, the differential gearing system may be constructed such that the ratio of a drive torque acting on the third rotationally-operative end to that acting on the second rotationally-operative end is greater than the ratio of a required torque for the third rotationally-operative end to achieve film-advance operation to that of the second rotationally-operative end to achieve zoom operation, so that energizing the motor will cause rotation of the third rotationally-operative end and no rotation of the second rotationally-operative end unless the former is prevented from rotation. Further, the drive train may further comprise a rotation preventing mechanism, which is inactive when the zoom control knob is at the inoperative position while active when the zoom control knob is at one of the first and second operative positions to prevent rotation of the third rotationally-operative end.

In addition, in such a case, the ring-gear-rotation preventing mechanism may comprise a clamp mechanism for clamping the third rotationally-operative end to prevent rotation thereof when the zoom control knob is at one of the first and second operative positions. Alternatively, the ring-gear-rotation preventing mechanism may comprise a clamp mechanism for clamping a part of the film-advance mechanism to prevent rotation of the third rotationally-operative end when the zoom control knob is at one of the first and second operative positions.

Having described the present invention with reference to the preferred embodiment thereof, it is to be understood that the present invention is not limited to the disclosed embodiment, but may be embodied in various other forms without departing from the spirit and the scope of the present invention as defined by the appended claims.

What is claimed is:

1. A camera comprising:

a camera body;

a zoom lens capable of continuous zoom operation between a longest-focal-length end and a shortest-focal-length end;

a film-advance mechanism for advancing a roll of film loaded in said camera;

a zoom control knob provided on said camera body for camera user's operation, said zoom control knob having three positions including an inoperative position for inactivating zoom operation and first and second operative positions for activating zoom operation toward said longest-focal-length end and zoom operation toward said shortest-focal-length end, respectively;

a drive power unit including an electric motor for providing a drive torque;

a motor control for controlling energized/de-energized state and rotating direction of said motor; and a drive train cooperative with said zoom control knob and operatively interconnecting said drive power unit, said zoom lens and said film-advance mechanism, for selectively allowing said zoom lens and said film-advance mechanism to be driven by said drive power unit in accordance with current position of said zoom control knob.

2. A camera according to claim 1, wherein:

said drive train comprises a differential gearing system having first, second and third rotationally-operative ends, among which a drive torque may be transmitted;

said first, second and third rotationally-operative ends are operatively connected to said drive power unit, said zoom lens and said film-advance mechanism, respectively;

said differential gearing system is constructed such that the ratio of a drive torque acting on said third rotationally-operative end to that acting on said second rotationally-operative end is greater than the ratio of a required torque for said third rotationally-operative end to achieve film-advance operation to that of said second rotationally-operative end to achieve zoom operation, so that energizing said motor will cause rotation of said third rotationally-operative end and no rotation of said second rotationally-operative end unless the former is prevented from rotation; and said drive train further comprises a rotation preventing mechanism, which is inactive when said zoom control knob is at said inoperative position while active when said zoom control knob is at one of said first and second operative positions to prevent rotation of said third rotationally-operative end.

3. A camera according to claim 2, wherein:

said ring-gear-rotation preventing mechanism comprises a clamp mechanism for clamping said third rotationally-operative end to prevent rotation thereof when said zoom control knob is at one of said first and second operative positions.

4. A camera according to claim 2, wherein:

said ring-gear-rotation preventing mechanism comprises a clamp mechanism for clamping a part of said film-advance mechanism to prevent rotation of said third rotationally-operative end when said zoom control knob is at one of said first and second operative positions.

5. A camera according to claim 1, wherein:

said drive power unit has an output shaft for outputting a drive torque;

said zoom lens has an input member to be driven to achieve zoom operation;

said film-advance mechanism has an input member to be driven to achieve film-advance operation; and said drive train operatively interconnects said output shaft of said drive power unit, said input member of said zoom lens and said input member of said film-advance mechanism.

6. A camera according to claim 5, wherein:

said drive train comprises a planetary gearing system having a sun gear, a planetary carrier-and-gear-wheel assembly and a ring gear, which are supported for rotation about a common axis;

said planetary carrier-and-gear-wheel assembly includes one or more planetary gear wheels in engagement with both said sun gear and said ring gear so as to transmit a drive torque among said sun gear, said planetary carrier-and-gear-wheel assembly and said ring gear;

said sun gear, said planetary carrier-and-gear-wheel assembly and said ring gear are operatively connected to said output shaft of said drive power unit, said input member of said zoom lens and said input member of said film-advance mechanism, respectively;

said planetary gearing system is constructed such that the ratio of a drive torque acting on said ring gear to that acting on said planetary carrier-and-gear-wheel assembly is greater than the ratio of a required torque for said ring gear to achieve film-advance operation to that for said planetary carrier-and-gear-wheel assembly to achieve zoom operation, so that energizing said motor will cause rotation of said ring gear and no rotation of said planetary carrier-and-gear-wheel assembly unless the former is prevented from rotation; and said drive train further comprises a ring-gear-rotation preventing mechanism, which is inactive when said zoom control knob is at said inoperative position while active when said zoom control knob is at one of said first and second operative positions to prevent rotation of said ring gear.

7. A camera according to claim 6, wherein:

said ring-gear-rotation preventing mechanism comprises a clamp mechanism for clamping said ring gear to prevent rotation thereof when said zoom control knob is at one of said first and second operative positions.

8. A camera according to claim 7, wherein:

said clamp mechanism comprises a coiled spring secured to said camera body and surrounding a portion of said ring gear;

said zoom control knob is supported by said camera body for movement between said first and second operative positions, with said inoperative position being defined between said first and second operative positions; and said coiled spring has two end arms each engageable with both said camera body and said zoom control knob such that said coiled spring is tightened against and thereby clamps said portion of said ring gear to prevent rotation of said ring gear when said zoom control knob is at one of said first and second operative positions while said coiled spring is loosened from and thereby releases said portion of said ring gear to permit rotation of said ring gear when said zoom control knob is at said inoperative position.

9. A camera according to claim 6, wherein:

said film-advance mechanism comprises a film take-up spool of a generally hollow cylindrical shape having an axis;

said drive power unit is of a generally cylindrical shape having an axis, with which said output shaft of said drive power unit is coaxial; and said drive power unit is disposed in said film take-up spool such that said axis of said drive power unit and said axis of said film take-up spool are both coaxial with said planetary gearing system.

10. A camera according to claim 9, wherein:

said drive power unit further includes a reduction gear box associated with said electric motor.

11. A camera according to claim 1, wherein:

said camera further comprises first and second electrical switches to be actuated by said zoom control knob when said zoom control knob is actuated into said first and second operative positions, respectively; and said motor control controls the rotating direction of said electric motor in response to open/close conditions of said electrical switches.

* * * * *